(12) United States Patent
Kadashevich et al.

(10) Patent No.: US 9,160,695 B2
(45) Date of Patent: Oct. 13, 2015

(54) MINIMIZING THE EFFECTS OF EMAIL ATTACHMENTS ON COMMUNICATION NETWORKS

(71) Applicant: International Business Machines Corporation, Armonk, NY (US)

(72) Inventors: A. Julie Kadashevich, Tyngsboro, MA (US); Jane B. Marcus, Medford, MA (US); Jessica L. Piziak, Ayer, MA (US); Purvi K. Trivedi, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/733,210

(22) Filed: Jan. 3, 2013

(65) Prior Publication Data
US 2014/0189021 A1    Jul. 3, 2014

(51) Int. Cl.
*G06F 15/16*    (2006.01)
*H04L 12/58*    (2006.01)

(52) U.S. Cl.
CPC ................................ *H04L 51/08* (2013.01)

(58) Field of Classification Search
USPC .................. 709/206, 203, 219, 223
See application file for complete search history.

(56) References Cited

U.S. PATENT DOCUMENTS

| | | | |
|---|---|---|---|
| 2003/0055907 A1* | 3/2003 | Stiers ............................ | 709/206 |
| 2007/0174394 A1* | 7/2007 | Jayaweera .................... | 709/206 |
| 2008/0033957 A1 | 2/2008 | Forstall et al. | |
| 2008/0195705 A1 | 8/2008 | Lee | |
| 2009/0187814 A1 | 7/2009 | Raff | |
| 2009/0192845 A1 | 7/2009 | Gudipaty et al. | |
| 2009/0248808 A1* | 10/2009 | Izumi et al. ................... | 709/206 |
| 2010/0313239 A1 | 12/2010 | Chakra et al. | |

* cited by examiner

*Primary Examiner* — El Hadji Sall
(74) *Attorney, Agent, or Firm* — Isaac J. Gooshaw

(57) ABSTRACT

A first computer receives a first message that includes an electronic attachment from a second computer over a communications network. The first computer saves the electronic attachment in a storage device. The first computer removes the electronic attachment from the first message. The first computer adds a link to the first message; wherein the link permits access to download the saved electronic attachment. The first computer sends to a third computer the first message including the link that permits access to download the saved electronic attachment.

20 Claims, 3 Drawing Sheets

MINIMIZING THE EFFECTS OF EMAIL ATTACHMENTS ON COMMUNICATION NETWORKS

FIELD OF THE INVENTION

The present invention relates generally to the field of communication workload, and more particularly to processing emails that contain attachments.

BACKGROUND OF THE INVENTION

One of the reasons for the proliferation of email as a means of communication has been the ability to attach documents. In general, any document in any format can be sent to nearly any part of the world. As email is increasingly utilized as a medium for collaboration and document exchange, the underlying cost associated with sending an email has proportionately increased as administration, bandwidth, and storage costs rise. A major cause of this cost is email attachments, which can make up more than 85% of all email data. It has been estimated that approximately 20% of all emails contain attachments, while as much as 92% of email resources are consumed by attachments.

Test results have demonstrated that as emails with attachments pass through email servers the average processing loads on the email servers are substantially higher for emails with attachments when compared to emails without attachments. As more emails with attachments are sent out, the server load levels may proportionately increase. In many cases, out of the total number of email attachments, many of documents are not original documents, but rather revisions or duplicates. Often, it can be challenging to collate numerous versions of an attachment together to form a final version. In addition, at any given time, none of the recipients are guaranteed to have the latest version of the attachment.

In a world of heightened security, email attachments can represent a point of vulnerability for many document security plans. Once shared, an attachment can become a type of public property where the recipients are able to do whatever they want with the attachment. In general, the sender of an attachment has little control over the access rights to the attachment, neither can the sender control what the recipients can do with the attachment.

SUMMARY

Embodiments of the present invention disclose a method, computer program product, and system for minimizing a workload on a communications network. A first computer receives a first message from a second computer over a communications network, wherein the first message includes an electronic attachment. The first computer saves the electronic attachment in a storage device. The first computer removes the electronic attachment from the first message. The first computer adds a link to the first message; wherein the link permits access to download the saved electronic attachment. The first computer sends to a third computer the first message including the link that permits access to download the saved electronic attachment.

DETAILED DESCRIPTION

Figure 1:
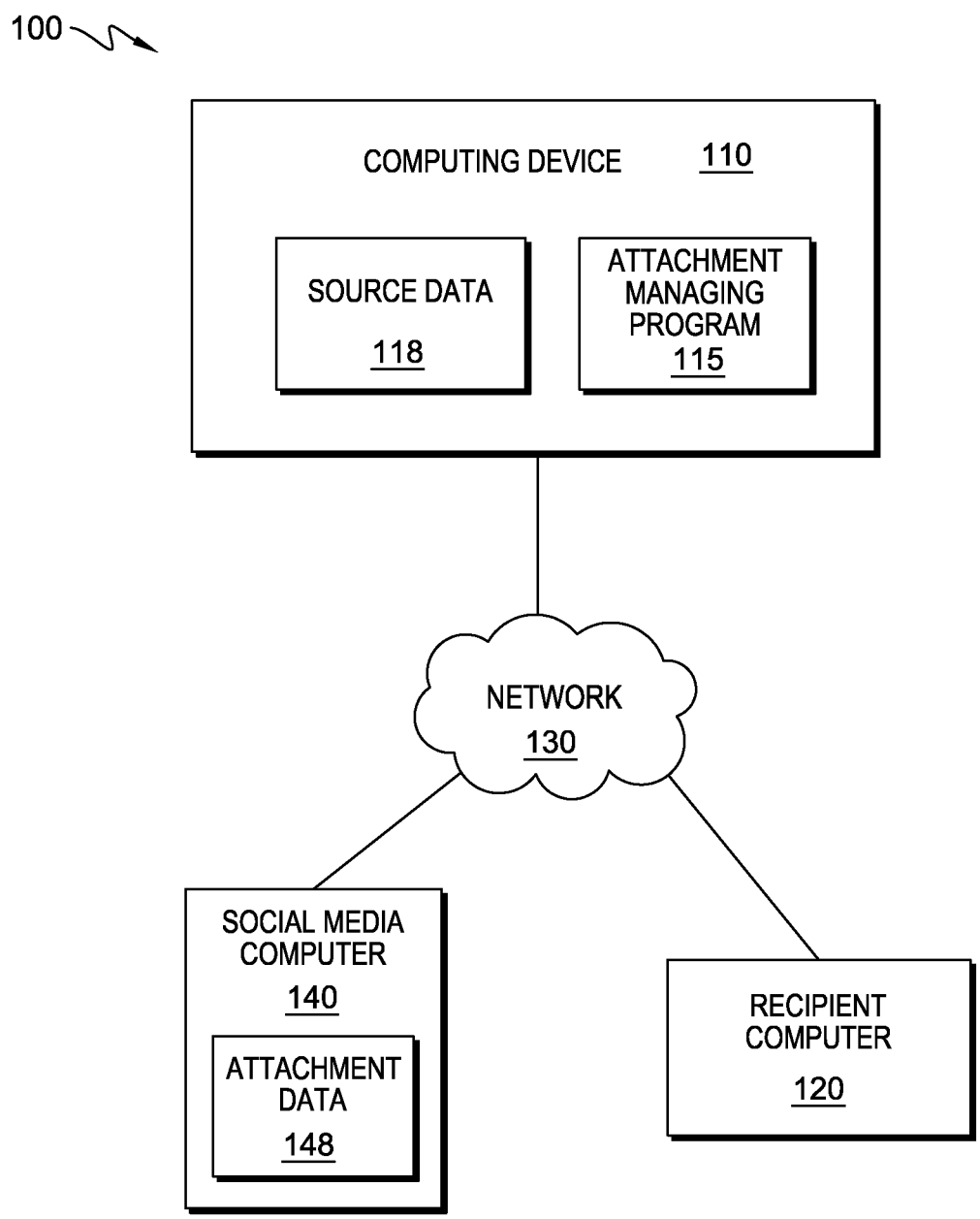
FIG. 1 is a functional block diagram illustrating a communication network environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a communication network environment, generally designated 100, in accordance with one embodiment of the present invention.

Communication network environment 100 includes computing device 110, recipient computer 120, and social media computer 140, all interconnected over network 130.

In this exemplary embodiment, attachment managing program 115 and source data 118 are stored on computing device 110. However, in other embodiments, attachment managing program 115 and source data 118 may be stored externally and accessed through a communication network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110, recipient computer 120, and social media computer 140 in accordance with a desired embodiment of the present invention.

In various embodiments of the present invention, computing device 110, recipient computer 120, and social media computer 140 can be personal digital assistants (PDAs), a smart phones, servers, laptop computers, tablet computers, netbook computers, personal computers (PCs), or desktop computers. In another embodiment, computing device 110 represents a computing system utilizing clustered computers and components to act as a single pool of seamless resources. In general, computing device 110 can be any computing device or a combination of devices with the ability to access source data 118 and is capable of executing attachment managing program 115. Computing device 110, recipient computer 120, and social media computer 140 may include internal and external hardware components, as depicted and described in further detail with respect to FIG. 3.

In this exemplary embodiment, computing device 110 sends emails that may include attachments to recipient computer 120. Social media computer 140 acts, in general, as a data storage site for attachment data 148. In exemplary embodiments, social media computer 140 is a social file sharing network that provides users with access to uploaded data, such as Lotus Live™.

In exemplary embodiments, computing device 110 is configured to send emails with a link to a corresponding attachment that is attached to the email to recipient computer 120. Furthermore, computing device 110 provides data, that corresponds to the attachment that is attached to the email, to social media computer 140 to be stored as attachment data 148. The stored attachment data 148 can be accessed by recipient computer 120 after an email containing a link to the data has been received by recipient computer 120.

Attachment managing program 115 is a data management program that helps minimize the workload placed on communication networks due to email attachments. Attachment managing program 115 further operates to automatically upload data to a data storage site, establish an access control list for the uploaded data, and change, as needed, the access control list for the uploaded data stored in the data storage site. Attachment managing program 115 operates in conjunction with a data storage site (e.g., social media computer 140) and a program used for the creation and sending of emails. As emails containing links to data (attachments) are sent out, attachment managing program 115 passes the data (which is stored as source data 118 and associated with the link) to social media 140.

Attachment managing program 115 also passes updates to the data to social media 140 such that the data stored as attachment data 148 generally reflects the updates made to the data stored as source data 118. In some embodiments, updates to the data stored as attachment data 148 can originate from the recipients of the email. In other embodiments, the functions of Attachment managing program 115 can be split between multiple programs operating on computing device 110, recipient computer 120, and social media computer 140.

The use of a link as to provide access to attachment data and/or access to an updated data of an attachment can substantially decrease the workload of many email based attachment sharing systems. Current attachment sharing approaches typically send a copy of an attachment to each listed recipient of the email and if an updated attachment is produced it is also sent to every recipient. By providing a link to an updatable file the workload, placed on the communications network, of sending attachments can be minimized. The attachment data is only sent to those who request the attachment data, i.e., by opening the link the attachment data is requested.

For example, an email which lists 200 recipients is sent out with a link to an attachment. However, only 102 of those recipients open the link. The workload to provide the attachment data to the recipients has thus been reduced by 49% since 49% of the recipients did not request the data of the attachment. In another example the attachment is updated several times after the email containing the link was sent. However, instead of the data of the attachment being sent out to every recipient each time there is an update, the updated data of the attachment is only sent when requested via the link. By reducing the number of copies of an attachment (i.e., total amount of data sent) sent per email and/or per attachment update the workload placed on a given communication network is thus minimized.

The utility of attachment managing program 115 is not limited to decreasing the workload of many email based attachment sharing systems. The automatic uploading of data to a data storage site, establishment of an access control list for the data, and updating the access control list for the uploaded data is also of substantial utility. Typically, in known art, as new files are uploaded to file sharing networks a new set of permissions for each recipient must be generated according to input supplied by a user, every time, for each new file. By automating the uploading of data and access to that data the amount of time and effort required on the part of a user can be substantially reduced.

For example, if the user who owns the uploaded data has multiple audiences for the uploaded data, each audience can be added to the access control list associated with the data. As updates are made to the uploaded data, such as new documents being added to the uploaded data, the access control list associated with the data is automatically updated so each audience retains the appropriate level of access to the uploaded data. In a preferred embodiment, attachment managing program 115 can automatically apply a standard access control list for a given type of uploaded data such that a default set of permissions can be applied to any uploaded data of that type. Thus, attachment managing program 115 can reduce the time and effort required to provide recipients with access to uploaded data while retaining access control over the uploaded data.

Figure 2:
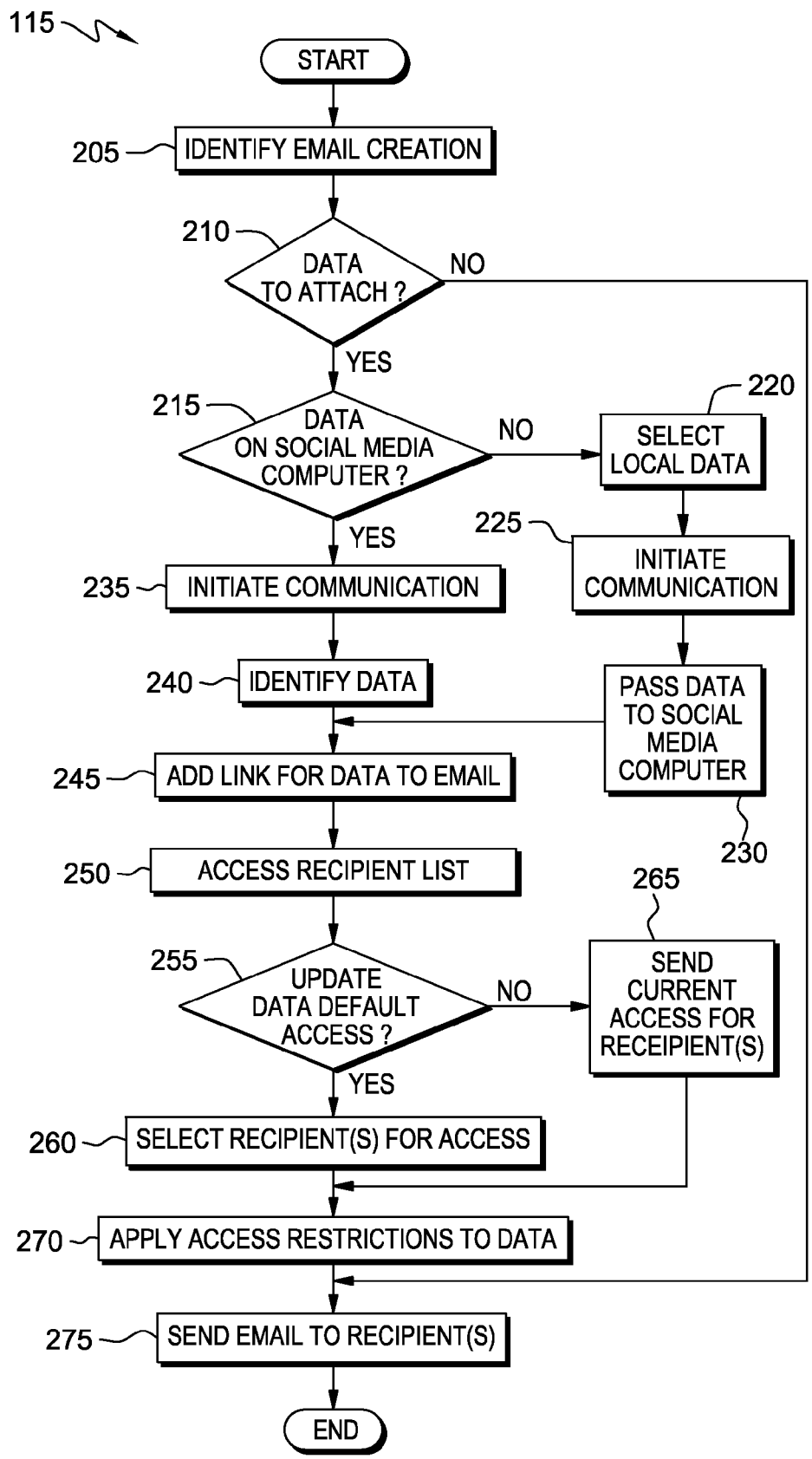
FIG. 2 illustrates operational steps of an attachment managing program, on a computing device within the communication network environment of FIG. 1, in accordance with an embodiment of the present invention.

FIG. 2 is a flowchart depicting operational steps of attachment managing program 115 for minimizing the workload placed on communication networks due to email attachments, in accordance with an embodiment of the present invention.

Attachment managing program 115 identifies the creation of an email (step 205) and determines if there are any attachments associated with the email (determination step 210). If there are no files to be attached (determination step 210, no branch) then attachment managing program 115 sends the email to the designated recipients (step 275). If there are files to be attached (determination step 210, yes branch) then attachment managing program 115 searches for an indication that the data of the attachment has been stored in attachment data 148. For example, attachment managing program 115 identifies the creation of an email on computing device 110 and checks the email for attachments. Attachment managing program 115 identifies five attachments associated with the email. Attachment managing program 115 retrieves a list of uploaded files that have been sent from computing device 110 to attachment data 148 and compares the attachments of the email to the list of uploaded files.

Attachment managing program 115 identifies if the data of the attachment, including an updated versions of the data of the attachment, is stored in social media computer 140 (determination step 215). If attachment managing program 115 identifies that the data of the attachment, or an updated version of the data of the attachment, is not located on social media computer 140 (determination step 215, no branch) then attachment managing program 115 identifies the data of the attachment in source data 118 (step 220) and initiates communication with social media computer 140 (step 225). After communication has been confirmed between computer 110 and social media computer 140 then the data of the attachment is passed from source data 118 to social media computer 140 where the data of the attachment is stored as attachment data 148 (step 230).

If attachment managing program 115 is able to identify that the data of the attachment has already been passed to social media computer 140 by comparing the attachment to a list of data previously uploaded to social media computer 140 (determination step 215, yes branch) then communication is initiated with social media computer 140 (step 235) and the appropriate data/files are identified from the data stored in attachment data 148 (step 240). For example, attachment managing program 115 identifies that the data of an updated attachment has already been passed to social media computer 140. Attachment managing program 115 then searches attachment data 148 to confirm that the updated attachment data exists and is intact.

After attachment managing program 115 has determined that the appropriate data/files are stored in source data 118 then it generates and includes a link (to the appropriate data/files stored in attachment data 148) in the email (step 245). Attachment managing program 115 accesses the list of recipients (step 250). Then attachment managing program 115 determines if an update is required for the recipients default access settings (authorization, access parameter) for the data associated with the link (determination step 255). For example, attachment managing program 115 compares the list of recipients with a list of access settings. The recipients that do not have access are identified and attachment managing program 115 presents this information to the email sender. The sender can then indicate whether or not they wish to update the access settings. If an update is required (determination step 255, yes branch) then recipient(s) are selected and their access to the data is designated (step 260). If an update to the default access settings is not required (determination step 255, no branch) then the current access or default access for recipient(s) is selected and their access to the data is designated (step 265). The access settings are then associated to the link (step 270) and the email, now containing the link and access settings, is sent to recipient computer 120.

Figure 3:
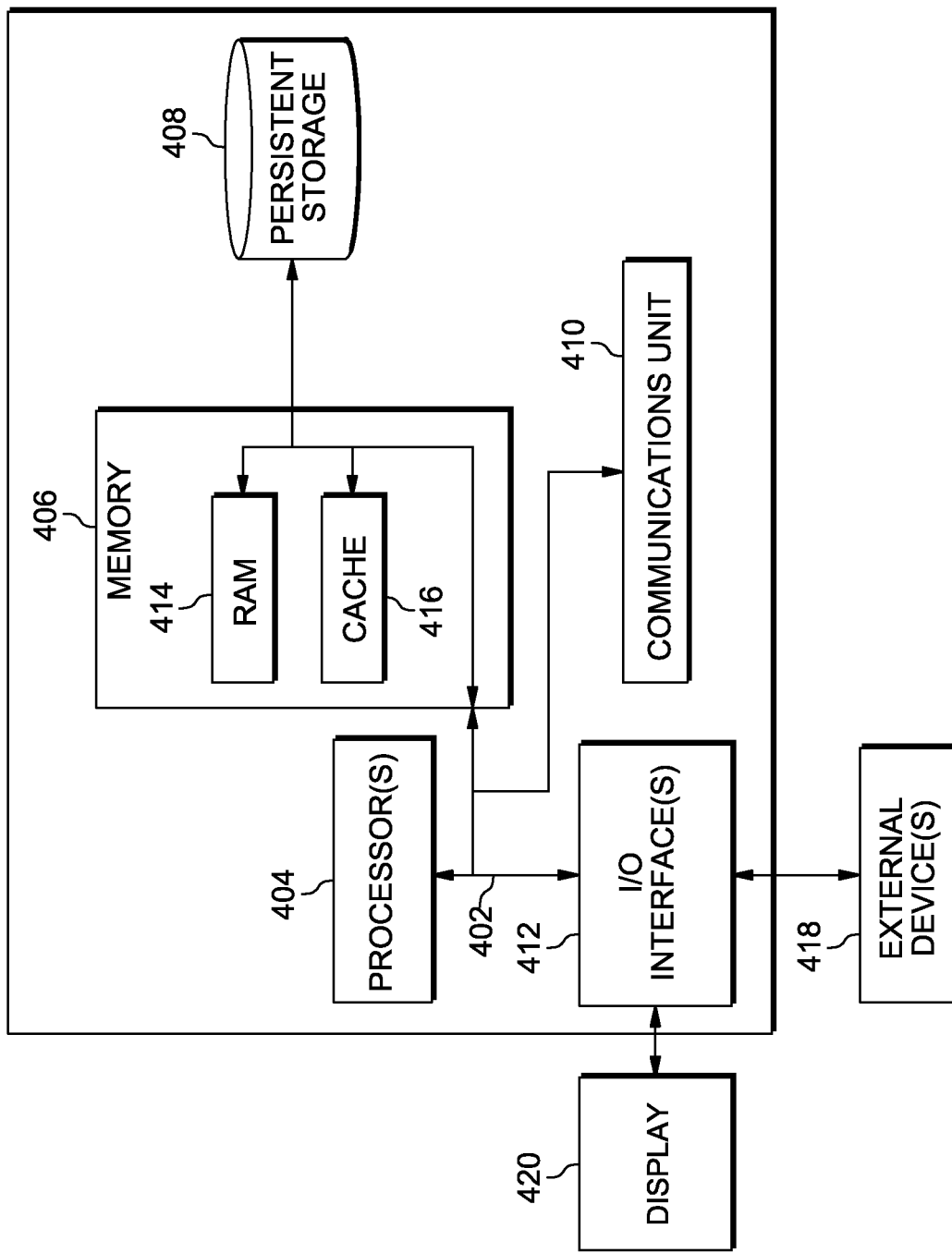
FIG. 3 depicts a block diagram of components of the computing device executing the attachment managing program, in accordance with an embodiment of the present invention.

FIG. 3 depicts a block diagram of components of computing device 110, recipient computer 120, and social media computer 140 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110, recipient computer 120, and social media computer 140 include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Attachment managing program 115 and source data 118 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of recipient computer 120 and social media computer 140. In these examples, communications unit 410 includes one or more network interface cards. Communications unit 410 may provide communications through the use of either or both physical and wireless communications links. Attachment managing program 115 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., attachment managing program 115, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for minimizing a workload on a communications network, the method comprising:
   a first computer receiving a first message from a second computer over a communications network, wherein the first message includes an electronic attachment;
   the first computer determining whether a version of the electronic attachment exists in a storage device;
   responsive to a determination that the version of the electronic attachment does not exist in the storage device, the first computer saving the electronic attachment in the storage device, wherein the saving comprises:
     the first computer saving a copy of the electronic attachment in the storage device as the version of the electronic attachment;
     the first computer removing the electronic attachment from the first message; and
     the first computer adding a link to the first message, wherein the link permits access to download the version of the electronic attachment;
   the first computer receiving an updated version of the electronic attachment;
   the first computer updating the version of the electronic attachment that is included in the storage device, based, at least in part on the updated version of the electronic attachment;
   responsive to a request being received from a third computer for access to the version of the electronic attachment, the first computer determining whether the third computer has authorization to access the version of the electronic attachment;
   responsive to a determination that the third computer has authorization to access the version of the electronic attachment, the first computer accessing the version of the electronic attachment; and
   the first computer sending to the third computer the first message including the link that permits access to download the version of the electronic attachment.

2. The method of claim 1, further including the steps of:
   the first computer receiving an access control information for the electronic attachment from the second computer.

3. The method of claim 1, further including the steps of:
   the first computer receiving a first request from the third computer for access to the version of the electronic attachment via activation of the link.

4. The method of claim 1, further including the steps of:
   the first computer receiving from the third computer an updated version of the electronic attachment; and
   the first computer updating the version of the electronic attachment that is included in the storage device, based, at least in part on the updated version of the electronic attachment.

5. The method of claim 1, further including the steps of:
   the first computer receiving from the second computer an updated version of the electronic attachment; and the first computer updating the version of the electronic attachment that is included in the storage device, based, at least in part on the updated version of the electronic attachment.

6. The method of claim 1, further including the steps of:
responsive to a request being received from the third computer for access to the version of the electronic attachment, the first computer determining whether the version of the electronic attachment exists in the storage device;
responsive to a determination that the version of the electronic attachment does not exist in the storage device, the first computer sending a request for the electronic attachment to the second computer;
the first computer receiving the electronic attachment from the second computer; and
the first computer saving a received version of the electronic attachment in the storage device, wherein the received version of the electronic attachment is sent by the second computer.

7. The method of claim 1, further including the step of:
responsive to a determination that the third computer does not have authorization to access the version of the electronic attachment, the first computer sending a message to the third computer, wherein the message indicates that the third computer does not have authorization to access the version of the electronic attachment.

8. The method of claim 2, wherein the access control information that is passed to the first computer includes a list of recipients for the electronic attachment and at least one access parameter for at least one recipient included in the list of recipients.

9. A computer system for minimizing a workload on a communications network, the computer system comprising:
one or more computer processors;
one or more computer-readable storage media;
program instructions stored on the computer-readable storage media for execution by at least one of the one or more processors, the program instructions comprising:
program instructions to receive a first message from a second computer over a communications network, wherein the first message includes an electronic attachment;
program instructions to determine whether a version of the electronic attachment exists in a storage device;
program instructions to respond to a determination that the version of the electronic attachment does not exist in the storage device by saving the electronic attachment in the storage device, wherein saving the electronic attachment comprises:
saving a copy of the electronic attachment in the storage device as the version of the electronic attachment;
removing the electronic attachment from the first message; and
adding a link to the first message, wherein the link permits access to download the version of the electronic attachment;
program instructions to receive an updated version of the electronic attachment;
program instructions to update the version of the electronic attachment that is included in the storage device, based, at least in part on the updated version of the electronic attachment;
program instructions to respond to a request being received from a third computer for access to the version of the electronic attachment by determining whether the third computer has authorization to access the version of the electronic attachment;
program instructions to respond to a determination that the third computer has authorization to access the version of the electronic attachment by accessing the version of the electronic attachment; and
program instructions to send to a third computer the first message including the link that permits access to download the version of the electronic attachment.

10. The computer system of claim 9, further including:
program instructions to receive an access control information for the electronic attachment from the second computer.

11. The computer system of claim 9, further including:
program instructions to respond to a request being received from the third computer for access to the version of the electronic attachment by determining whether the version of the electronic attachment exists in the storage device;
program instructions to respond to a determination that the version of the electronic attachment does not exist in the storage device by sending a request for the electronic attachment to the second computer;
program instructions to receive the electronic attachment from the second computer; and
program instructions to respond save a received version of the electronic attachment in the storage device, wherein the received version of the electronic attachment is sent by the second computer.

12. The computer system of claim 9, further including:
program instructions to respond to a determination that the third computer does not have authorization to access the version of the electronic attachment by sending a message to the third computer, wherein the message indicates that the third computer does not have authorization to access the version of the electronic attachment.

13. A computer program product for minimizing a workload on a communications network, the computer program product comprising:
one or more computer-readable storage media and program instructions stored on the one or more computer-readable storage media, the program instructions comprising:
program instructions to receive a first message from a second computer over a communications network, wherein the first message includes an electronic attachment;
program instructions to determine whether a version of the electronic attachment exists in a storage device;
program instructions to respond to a determination that the version of the electronic attachment does not exist in the storage device by saving the electronic attachment in the storage device, wherein saving the electronic attachment comprises:
saving a copy of the electronic attachment in the storage device as the version of the electronic attachment;
removing the electronic attachment from the first message; and
adding a link to the first message, wherein the link permits access to download the version of the electronic attachment;
program instructions to receive an updated version of the electronic attachment;

program instructions to update the version of the electronic attachment that is included in the storage device, based, at least in part on the updated version of the electronic attachment;

program instructions to respond to a request being received from a third computer for access to the version of the electronic attachment by determining whether the third computer has authorization to access the version of the electronic attachment;

program instructions to respond to a determination that the third computer has authorization to access the version of the electronic attachment by accessing the version of the electronic attachment; and program instructions to send to a third computer the first message including the link that permits access to download the version of the electronic attachment.

14. The computer program product of claim 13, further including:
program instructions to receive an access control information for the electronic attachment from the second computer.

15. The computer program product of claim 13, further including:
program instructions to receive a first request from the third computer for access to the version of the electronic attachment via activation of the link.

16. The computer program product of claim 13, further including:
program instructions to receive from the third computer an updated version of the electronic attachment; and
program instructions to update the version of the electronic attachment that is included in the storage device, based, at least in part on the updated version of the electronic attachment.

17. The computer program product of claim 13, further including:
program instructions to receive from the second computer an updated version of the electronic attachment; and
program instructions to update the version of the electronic attachment that is included in the storage device, based, at least in part on the updated version of the electronic attachment.

18. The computer program product of claim 13, further including:
program instructions to respond to a request being received from the third computer for access to the version of the electronic attachment by determining whether the version of the electronic attachment exists in the storage device;
program instructions to respond to a determination that the version of the electronic attachment does not exist in the storage device by sending a request for the electronic attachment to the second computer;
program instructions to receive the electronic attachment from the second computer; and
program instructions to respond save a received version of the electronic attachment in the storage device, wherein the received version of the electronic attachment is sent by the second computer.

19. The computer program product of claim 13, further including:
program instructions to respond to a determination that the third computer does not have authorization to access the version of the electronic attachment by sending a message to the third computer, wherein the message indicates that the third computer does not have authorization to access the version of the electronic attachment.

20. The computer program product of claim 14, wherein the access control information that is passed to the first computer includes a list of recipients for the electronic attachment and at least one access parameter for at least one recipient included in the list of recipients.

* * * * *